United States Patent [19]

Ong et al.

[11] Patent Number: 4,663,250
[45] Date of Patent: May 5, 1987

[54] REDUCTION OF ELECTRODE DISSOLUTION

[75] Inventors: Estela T. Ong, Chicago; Leonard G. Marianowski, South Holland, both of Ill.

[73] Assignee: Institute of Gas Technology, Chicago, Ill.

[21] Appl. No.: 838,960

[22] Filed: Mar. 12, 1986

[51] Int. Cl.$^4$ ............................................. H01M 8/14
[52] U.S. Cl. ...................................... 429/16; 429/41; 429/44; 429/46; 29/623.1
[58] Field of Search ....................... 429/16, 40, 41, 44, 429/46; 29/623.1, 623.5; 252/182.1

[56] References Cited

U.S. PATENT DOCUMENTS

| | | | |
|---|---|---|---|
| 4,079,171 | 3/1978 | Marianowski et al. | 429/46 |
| 4,247,604 | 1/1981 | Marianowski et al. | 429/40 |
| 4,404,267 | 9/1983 | Iacovangelo et al. | 429/41 |
| 4,411,968 | 10/1983 | Reiser et al. | 429/41 |

Primary Examiner—Anthony Skapars
Attorney, Agent, or Firm—Thomas W. Speckman

[57] ABSTRACT

Reduction of electrode metal dissolution in electrolyte between two metal electrodes of a voltaic cell by adding an electrode metal dissolution reduction agent to the electrolyte prior to operation of the cell, the electrode metal dissolution reduction agent being a sacrificial electrode metal, a metal promoting common ion effect with one of the electrode metals, seed metal particles serving as precipitation sites for an electrode metal, and combinations thereof. Reduction of the electrode metal dissolution in the electrolyte of a voltaic cell is also achieved by maintaining a partial pressure of carbon dioxide of about 0.5 to about 1.5 atmospheres in the electrolyte during operation of the cell. The method and electrolyte is particularly suited for molten carbonate fuel cells.

32 Claims, 1 Drawing Figure

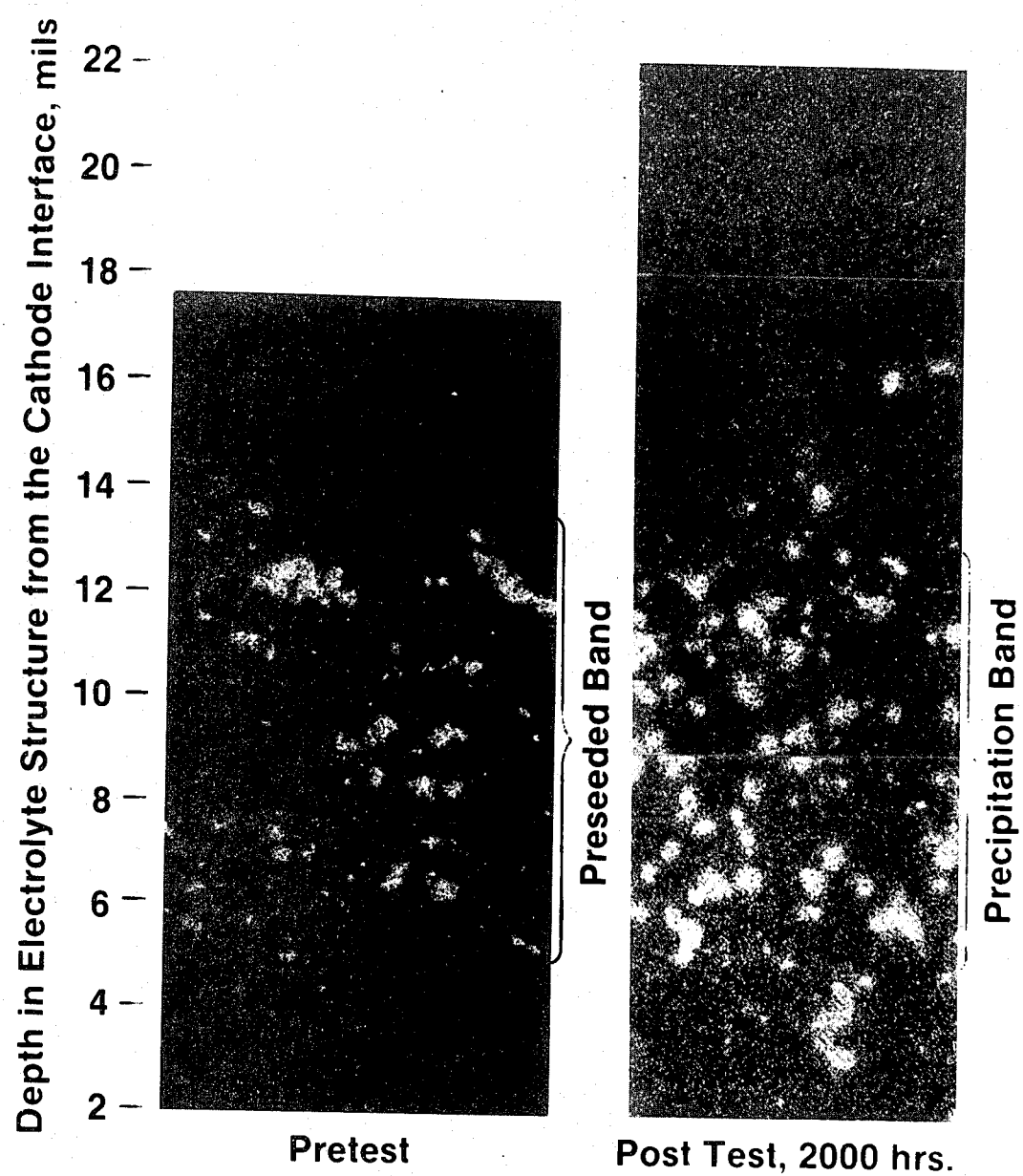

REDUCTION OF ELECTRODE DISSOLUTION

BACKGROUND OF THE INVENTION

1. Field of the Invention

This invention relates to a method and apparatus for increasing the stability of an electrolytic cell by reducing the dissolution of at least one of its electrodes. One important application of the present invention relates to modification of the electrolyte of a molten carbonate fuel cell to reduce the dissolution of a nickel cathode.

2. Description of the Prior Art

In a voltaic cell, chemical oxidation and reduction reactions produce an electromotive force and chemical energy is thereby directly converted to electrical energy. High temperature molten carbonate fuel cells are well known in the art for direct conversion of the chemical energy of hydrocarbons to electrical energy by a galvanic oxidation-reduction process.

Fuel cells, and in particular molten carbonate fuel cells, comprise five principal parts: a fuel chamber to which fuel mixture is fed; a fuel electrode, or anode and its current collector, where gaseous fuel is anodically oxidized by reaction with ions in the electrolyte; an oxidizer chamber to which a mixture of an oxygen containing gas and carbon dioxide is fed; an oxidizer electrode, or cathode and its current collector, where oxygen is galvanically reduced and reacted with carbon dioxide to produce oxygen containing anions; and electrolyte which conducts anions from the cathode to the anode. An external circuit may be provided to conduct the electron stream produced at the anode back to the cathode and thereby produce the desired current flow and electrical balance. To maintain a high level of stable performance, both electrolyte and electrode design and properties must be highly efficient and stabilized at the gas-electrolyte-electrode interface under cell operating conditions. A typical molten carbonate fuel cell is described in "Fuel Cells", edited by George J. Young, Reinhold Publishing Corporation, 1960, pps. 78–93.

Fused carbonates are fundamentally the best adapted salts for high temperature cells, since decomposition by the action of carbon dioxide will not occur and concentration polarization can be eliminated by supplying carbon dioxide withdrawn from the combustion products to the oxidizer chamber. The chemical reactions occurring at the electrodes are as follows:

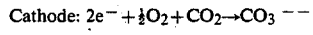

Cathode: $2e^- + \tfrac{1}{2}O_2 + CO_2 \rightarrow CO_3^{--}$

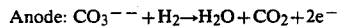

Anode: $CO_3^{--} + H_2 \rightarrow H_2O + CO_2 + 2e^-$

Thus, oxygen anions are conveyed through the electrolyte from the cathode to the anode in the form of carbonate anions.

Sophisticated molten carbonate fuel cell electrode configurations, structures and compositions are well known to the art. For example, a preferred molten alkali metal carbonates fuel cell porous anode with a stabilizing agent to maintain high porosity and high surface area is disclosed in U.S. Pat. No. 4,247,604. A porous nickel cathode is preferred for use in a molten carbonate fuel cell with the anode described in U.S. Pat. No. 4,247,604.

Sophisticated electrolyte structures have also been developed for use in molten carbonate fuel cells. Improved molten carbonates fuel cell electrolytes are described in U.S. Pat. Nos. 4,009,321 and 4,079,171 and have an operating composition of about 40 to 70 weight percent carbonates in a high surface area inert alkali metal aluminate support structure, such as lithium aluminate. Under fuel cell operating conditions, at temperatures from about 500° to about 750° C., the entire electrolyte structure, including carbonate electrolyte and inert support material, forms a paste and thus the electrolyte diaphragms of this type are known as paste electrolytes. Porous bubble barriers and composite molten carbonate fuel cell matrices, may be used to provide a gas cross leak barrier to reduce undesired mixing of gases across the electrolyte tile.

U.S. Pat. No. 3,357,861 teaches a diffusion barrier to reduce the problem of diffusion of fuel or oxidant or their products to a counterelectrode through an electrolyte having an ion exchange resin membrane between the electrodes. The diffusion barrier comprises catalysts dispersed in electrolyte or a porous layer comprising a porous plate, sieve, film, or the like, to destroy undesirable fuel or oxidant by chemical action to reduce the gradual buildup of fuel or oxidation product at the electrodes. The use of activated nickel in the diffusion barrier is disclosed.

U.S. Pat. No. 4,404,267 teaches an anode composite for use in a molten carbonate fuel cell comprising a porous sintered metallic anode with a porous bubble pressure barrier integrally sintered to one face of the anode. The porous bubble pressure barrier comprises metal coated ceramic particles sintered together and to the face of the anode by the metallic nickel, copper, or alloys thereof. The pore size of the barrier is significantly smaller than the pore size of the anode. U.S. Pat. No. 4,448,857 teaches a similar cathode composite with a porous sintered bubble pressure barrier of lithium nickel and lithium copper oxides sintered to one face of the cathode.

U.S. Pat. No. 4,411,968 teaches a molten carbonate fuel cell matrix having a matrix tape portion and a bubble barrier portion which rest against the fuel cell anode. Nickel, copper, and alloys thereof, are preferred for the bubble barrier sheet which is prepared by conventional techniques, such as powder sintering.

U.S. Pat. No. 4,137,371 teaches a zinc-oxygen cell with an oxygen electrode with a porous electrically conducting layer, a zinc electrode, and a diffusion barrier of zincate restricting membrane between the porous layer of the oxygen electrode and the zinc electrode. The diffusion restricting membrane is preferably an ion exchange membrane.

U.S. Pat. No. 4,405,416 teaches a molten salt lithium cell having an interface between a lithium electrode and electrolyte to control contact between the electrode surface and the electrolyte by the formation of a protective layer which is believed to be lithium oxide on the electrode.

U.S. Pat. No. 3,772,085 teaches a boundary layer of low halogen content electrolyte adjacent a metallic electrode to prevent electrolyte and halogen from contacting the electrode.

SUMMARY OF THE INVENTION

The problem of cell instability resulting from electrode dissolution in the electrolyte structure is present in molten carbonate fuel cells which operate at temperatures between about 500° and 750° C. In particular, the dissolution of a metallic nickel cathode in the electrolyte structure in molten carbonate fuel cells has been cause of cell instability. Dissolved nickel oxide species and nickel containing ions are transported from the cathode through the electrolyte structure toward the anode and are precipitated as metallic nickel in the electrolyte structure when the electrolyte environment becomes reducing. The presence of solubilized nickel oxide in the electrolyte structure of a molten carbonate fuel cell may limit the life of the fuel cell, especially when the fuel cell is operated at elevated pressures. Furthermore, as dissolved nickel oxide species approach the anode, and the electrolyte environment becomes reducing, the dissolved nickel species may be reduced and precipitated as metallic nickel in the electrolyte. Accumulation of these metallic nickel precipitates in a short-circuit of the fuel cell. Similar electrode dissolution may take place using other metal electrodes.

Metallic electrode dissolution, such as nickel oxide (NiO) cathode dissolution, in the electrolyte structure, particularly in solid or paste type electrolyes, may be reduced by providing in the electrolyte structure a sacrificial metal oxide source which will be preferentially dissolved instead of the cathode. The sacrificial metal may be the same metal as the electrode or may be a metal different from the electrode or may be a mixture of the same metal and the different metal which will promote a common ion effect to reduce electrode dissolution. In another embodiment metal particles serving as seeds, or precipitation sites, may be used to preestablish a metal precipitation band. The metal particle seeds may likewise be the same metal as the electrode or may be a metal different from the electrode or may be a mixture of the same metal and the different metal. While each of these embodiments may be used separately to reduce electrode dissolution, it is preferred to use both embodiments together for enhanced reduction of electrode dissolution. The sacrificial metal oxide source and the metal particle seeds may be incorporated into the electrolyte structure during its fabrication by incorporation of metal particles, metal mesh, or other porous metal structures. The metal particle seeds are suitably sized to serve as precipitation sites, generally about 0.1 micron to about 10 microns, preferably about 1 micron to about 5 microns. Another method is to place a layer structure comprising sacrificial metal, another layer structure comprising seed metal, and a metal-free electrolyte together during cell assembly to provide a continuous electrolyte matrix. Another embodiment is to place together during cell fabrication a single layer structure comprising both sacrificial and seed metal, such as nickel, and a nickel-free electrolyte matrix. The sacrificial metal is preferably provided in the oxidizing zone in a layer toward the cathode. The seed metal is preferably provided in the region of the oxidizing/reducing boundary to a depth of about 2 to about 20 mils from that boundary.

The sacrificial metal will oxidize during cell operation and part will dissolved in the electrolyte to provide the metal oxide for equilibrium solubility in the electrode-electrolyte system of the operating cell. Without the sacrificial metal, the dissolved metal would be furnished by the metal electrode. Additionally, the common negative ion effect will reduce the dissolution of the metal electrode.

The seed metal particles provided in the reducing zone of the electrolyte where the metal precipitates will remain in its reduced or metallic state. The seed metal may serve to reduce the metal precipitation rate in the electrolyte structure.

We have found that the rate of nickel accumulation in an initially nickel-free electrolyte of a molten carbonates fuel cell decreases with time of cell operation. Thus, with the nickel seeds or sacrifical nickel initially present in the electrolyte matrix, the rate of nickel precipitation will be reduced. The seed nickel provided in the reducing zone of the electrolyte was found to induce nucleation and thus reduced precipitation of nickel outside of the pre-seeded region of the electrolyte. This is especially important with thin electrolyte matrices where a narrow metallic precipitation zone is desired to prevent short circuits.

While the nickel dissolution barrier of this invention is described herein for use in molten carbonate fuel cells, it will be understood that a porous metal dissolution barrier provided at the described zones may be utilized to prevent electrode dissolution in any type of voltaic cell wherein oxidation and reduction reactions occur at the respective electrodes. A pre-existing dissolution barrier of the type described will be effective as long as the dissolution barrier comprises substantially the same metal as the electrode for which dissolution is desired to be prevented or a metal promoting a common ion effect with the electrode metal, and the dissolution barrier is positioned within the electrolyte structure away from the other electrode so that a pre-existing substantially steady state electrode metal composition may be established in the electrolyte, or sacrificial electrode metal or a metal promoting a common ion effect is preferentially dissolved.

The sacrificial and/or seed metal layer may serve simultaneously as a bubble barrier to reduce intermixing of the electrode gases through the electrolyte structure. In order to serve as an effective bubble barrier, this layer barrier must have a very tight pore structure. An effective bubble barrier has pores less than the mean pore sizes of the electrodes, or about 3 microns and less in diameter to prevent transport and intermixing of electrode gases through the electrolyte structure. A bubble barrier becomes especially important if the electrolyte structure develops void pores or cracks during fuel cell operating conditions.

Another means of modification of the electrolyte of an electrolytic cell to reduce dissolution of at least one of its electrodes is to maintain the electrolyte under near neutral conditions with respect to acid/base conditions under cell operating conditions. This may be achieved by maintaining the electrolyte melt under a positive partial carbon dioxide pressure, preferably about 1 atm.

BRIEF DESCRIPTION OF THE DRAWING

The FIGURE shows a photomicrograph of the cross section of a portion of an electrolyte structure with nickel seed particles according to one embodiment of this invention prior to fuel cell operation and following 2000 hours operation.

DESCRIPTION OF PREFERRED EMBODIMENTS

The reduction of electrode dissolution by electrolyte modification according to this invention is particularly well suited for use in molten alkali metal carbonate fuel cells. During molten carbonate fuel cell operation, oxygen and hydrogen dissolve in the melt and diffuse through the electrolyte structure toward each other from their respective electrodes, the cathode and the anode. In the zone in the electrolyte structure between the cathode and the anode where the molar concentration of hydrogen species is about twice the molar concentration of oxygen species hydrolysis may occur to convert the dissolved hydrogen and oxygen to water. The location in the electrolyte structure at which hydrolysis occurs may be calculated from diffusion equations for the dissolved gases. The diffusion equations for hydrogen and oxygen gases are as follows:

$$N_{H2} = \frac{D_{H2} \, Y_{H2} \, P \, H_{H2}}{\delta_{H2}}$$

$$N_{O2} = \frac{D_{O2} \, Y_{O2} \, P \, H_{O2}}{\delta_{O2}}$$

where:
N = concentration of dissolved species
D = diffusion coefficient
Y = gas concentration at electrode
P = operating pressure
H = Henry's constant for gas solubility
δ = distance from electrode When the molar concentration of hydrogen is twice that of oxygen, the following ratio of distance from the electrodes may be calculated:

$$\frac{\delta_{H2}}{\delta_{O2}} = \frac{1}{2} \frac{D_{H2}}{D_{O2}} \frac{Y_{H2}}{Y_{O2}} \frac{H_{H2}}{H_{O2}}$$

Since $\delta(H_2)/\delta(O_2)$ is much greater than 1, the hydrolysis zone is nearer the cathode. This hydrolysis zone, where water may be formed, marks the boundary between reducing and oxidizing zones in the electrolyte structure.

Calculation of the location of the boundary between reducing and oxidizing zones in the electrolyte of a molten carbonate fuel cell with a nickel cathode under fuel cell operating conditions has estimated the boundary at about ⅓th of the electrolyte structure thickness from the cathode. These calculations were confirmed by study of nickel distribution across the thickness of electrolyte structures that had been operated in fuel cells. A tape cast lithium aluminate electrolyte matrix having a thickness of 36 mils was operated for 2400 hours in a cell having a nickel cathode and a Ni+10%Cr anode on 60% $H_2$/40% $CO_2$ at 75% fuel utilization and 30% $CO_2$/70% air at 50% $CO_2$ utilization. Nickel particles were found to have started to precipitate in the zone at about 3 to about 4 mils from the cathode and to be concentrated in the zone of about 3 to 10 mils from the cathode. Metallic particle distribution was analyzed by energy dispersive x-ray and the nickel particles were confirmed by x-ray diffraction.

Another similar cell using a 65 mil thick Kanthal reinforced electrolyte tile was operated 3772 hours on 75% $H_2$/25% $CO_2$ at 75% $H_2$ utilization and 30% $CO_2$/70% air at 50% $CO_2$ utilization. This electrolyte showed nickel precipitation commenced at 4 to 5 mils from the cathode and was heavily segregated in the region 5 to 12 mils from the cathode.

Another similar cell using a 72 mil thick Kanthal reinforced electrolyte tile was operated 15,067 hours on 75% $H_2$/25% $CO_2$ at 75% $H_2$ utilization and 14% $CO_2$/86% air at 50% $CO_2$ utilization. This electrolyte showed nickel particles concentrated about 10 to 25 mils from the cathode and a smaller amount of nickel particles about 7 to 15 mils from the anode. The nickel particles near the anode are believed to have originated from the anode, perhaps by anode partial oxidation due to gas cross-over.

We have found that the boundary between reducing and oxidizing zones in the electrolyte may be moved by changing cell operating conditions such as: change in gas conversion at constant flow; change in cell potential; and changes in pressure. In a molten alkali carbonates fuel cell with an NiO cathode, nickel particles were dispersed in the oxidation zone throughout about half the thickness of the electrolyte from the cathode. Under load and usual gas conversions of fuel and oxidant, the nickel precipitate zone becomes narrower and is located further toward the anode. At constant flow and a different gas conversion, exemplified by open cell voltage, the nickel precipitation zone becomes broader and is located toward the cathode. When the cell is again placed under load, the nickel precipitate zone becomes narrower toward the anode. Such a dissolution/reprecipitation results in a relatively constant concentration of dissolved species in the electrolyte matrix and reduces dissolution of the cathode.

The invention will be specifically discussed with respect to one preferred embodiment of reduction of nickel cathode dissolution in a molten alkali carbonates fuel cell. When a thin, porous sacrificial layer of nickel or other metal promoting a common ion effect with nickel is positioned at or near the boundary between reducing and oxidizing zones in the electrolyte structure, a nearly steady-state nickel or common ion metal distribution may be pre-established in the electrolyte structure, to reduce the dissolution of nickel oxide from the nickel cathode. When the nickel or common ion metal is positioned between the cathode and the oxidizing/reducing boundary, it may act as a sacrificial cathode which is dissolved preferentially to the cathode. Suitable additives providing the common ion include transition metals. Particularly preferred are cobalt, iron and copper, each of which have been dissolved in the electrolyte of a molten carbonates fuel cell and under operating conditions have shown low nickel cathode dissolution.

Nickel oxide dissolution may be dependent upon the gas composition, carbon dioxide and oxygen partial pressures, the melt basicity. Humidity may also affect nickel oxide dissolution.

Dissolved nickel species may be transported through the electrolyte structure by at least two different mechanisms. Dissolved nickel species may be diffused through a concentration gradient, or they may be ionically transported through an electrical field. Positively charged ionic nickel species would not be ionically transported from the cathode, and so are presumed to be transported by diffusion. Negatively charged ionic nickel species, however, may be transported by either diffusion or ionic transport. We have found the nickel precipitation rate in operating molten alkali metal carbonates fuel cell electrolyte structures using nickel cathodes and initially nickel free 4.5"×4.5"×70-130 mils hot pressed electrolyte tiles was initially at a fast rate which decreased with operation time. We found the total nickel in the electrolyte structure to be: 1.45 gms at 2000 hours; 2.40 gms at 5000 hours; and 3.50 gms at 10,000 hours.

Control of the cathode nickel precipitation region by nickel seeding in the electrolyte of a molten carbonate fuel cell is demonstrated by the growth of the seed particles. The figure shows the microstructure of a 70 mil thick electrolyte structure having nickel seeds before operation and after 2000 hours of operation of a fuel cell having a nickel cathode. The elctrolyte structure containing nickel seeds was fabricated by hot pressing. With the bottom plunger in position, the electrolyte powder consisting of $LiAlO_2$, $Li_2CO_3$ and $K_2CO_3$ was distributed evenly in the die cavity layer by layer. To provide nickel in the 5 to 15 mil layer of the electrolyte structure, one-fourteenth of the total powder required was first laid on the bottom most layer of the die cavity. This layer corresponded to the first 5 mil layer of the 70 mil hot-pressed tile. Next, 5 wt percent nickel (or 1.5 vol percent) was added to one-seventh of the powder and the mixture was laid over the first layer. This layer then became the 5 to 15 mil layer of the 70 mil hot-pressed tile. The remainder of the powder was then laid on top of the nickel preseeded layer. The top plunger was then inserted and the mold is heated to 480° C. Upon reaching this temperature, a compressive load equivalent to 3550 psi on the plunger area was applied for 15 minutes. After cool down, the hot-pressed electrolyte was sufficiently consolidated and ready for cell test. It is seen that seed nickel particles grew in size during operation of the fuel cell and that no significant nickel precipitation was observed outside the preseeded region. The amount of additional nickel precipitated in the electrolyte structure during the 2000 hours of cell operation was 1.1 gram as compared to 1.45 gram obtained in an initially nickel free electrolyte under similar fuel cell operating conditions for the same period of time, or about a 25 percent reduction of cathode nickel dissolution.

Another modification of the electrolyte of a fuel cell providing low electrode dissolution is operation of the electrode, particularly the cathode, under conditions providing low electrode metal solubility under both acidic and basic considerations. This can be achieved by operation of the fuel cell oxidant composition so as to provide a carbon dioxide partial pressure about 0.5 to about 1.5 atmosphere under cell operating conditions. The acid-base equilibrium for molten carbonate electrolyte may be expressed by the reaction $$M_2CO_3 \rightleftharpoons M_2O + CO_2$$

where M represents the cationic species. The equilibrium constant, $K_d$, for this reaction is expressed as $$K_d = a_{M_2O} P_{CO_2}$$

Either $a_{M_2O}$ or $P_{CO_2}$ is a measure of the electrolyte acidity or basicity. In a basic electrolyte, NiO dissolves according to the reaction $$NiO_{(s)} + M_2O_{(l)} \rightarrow M_2NiO_{2(l)}$$

The solubility decreases as $a_{M_2O}$ decreases or as $P_{CO_2}$ increases according to the $a_{M_2O} P_{CO_2}$ relationship in the equilibrium constant equation. In acidic electrolyte, the dissolution mechanism is
$$NiO_{(s)} + CO_{2(g)} \rightarrow NiCO_{3(l)}$$
where solbuility decreases as $P_{CO_2}$ decreases or as $a_{M_2O}$ increases. Thus, reduced solubility is realized at $P_{CO_2} = 1$ atmosphere where both acidic and basic solubility of NiO are low.

We have also found it advantageous in reduction of electrode dissolution in the electrolyte of a fuel cell to utilize electrolyte materials providing reduced electrode metal solubility under fuel cell operating conditions. In similar alkali metal carbonates fuel cells with nickel cathodes operated under similar conditions for 2000 hours we have found an initially nickel free electrolyte of 55 mol % $Li_2CO_3$ — 45 mol % $Na_2CO_3$ contained 0.55 grams nickel as a result of cathode dissolution while an initially nickel free electrolyte of 62 mol % $Li_2CO_3$ — 38 mol % $K_2CO_3$ contained 1.84 grams nickel. Thus, for reduction of NiO cathode dissolution it is advantageous to use an Li-Na carbonates electrolyte in preference to an Li-K carbonates electrolyte.

This invention provides controlled electrode metal management in an electrolyte structure by preplacement of the electrode metal or a common ion metal in the electrolyte matrix in order to reduce dissolution of the electrode and to quickly establish an electrode metal or common ion metal equilibrium in the electrolyte. This can be achieved by preplacement of the electrode metal or common ion metal in the electrolyte in the region including the oxidizing and part of the reducing zones. The boundary between the oxidizing and reducing zones may be calculated or ascertained from examination of electrolyte structures removed from operating cells. In the case of many molten carbonate fuel cells utilizing nickel cathodes, this region includes 0 to 20 mils from the cathode. The electrode or common ion metal introduced to the electrolyte may comprise a single uniform structure or may comprise two different structures: preplacement of the electrode or common ion metal in the oxidizing region providing sacrificial material for dissolution in preference to the electrode and preplacement of the electrode or common ion metal near the oxidation/reduction boundary providing seed material to control the zone of electrode or sacrificial material. Either or both the sacrificial layer and the seed layer may serve as a bubble barrier if their pore structure is sufficiently tight.

Metallic fine screens, woven mesh, expanded sheets, fibers, and particles may be used as the sacrificial metal or seed site for precipitation in the electrolyte according to this invention. The sacrificial metal or seed sites may be placed in the desired location just prior to pressing the electrolyte in its fabrication. When using tape casting to form the thin electrolyte structure, thin tapes of predetermined thickness and composition may be laminated to form the desired electrolyte composition and structural configuration. When the pores of such an electrode dissolution barrier are less than about 3 microns in diameter, the dissolution barrier concurrently serves as a bubble barrier to the electrode gases.

Operation of the fuel cell in a manner to provide neutral electrolyte conditions provides reduced electrode dissolution. It is preferred to operate the fuel cell with carbon dioxide partial pressures of about 0.5 to 1.5 atmospheres.

Utilization of an electrolyte having low electrode metal solubility is advantageous. Use of an Li-Na carbonates electrolyte reduces nickel cathode dissolution as compared to an Li-K carbonates electrode in a molten carbonates fuel cell.

The method of reduction of electrode metal dissolution in electrolyte between two metal electrodes of a voltaic cell wherein oxidation occurs at one electrode and reduction occurs at the second electrode has been set forth and shown to be effective, the method being effected by adding an electrode metal dissolution agent to the electrolyte prior to operation of the cell. The electrode metal dissolution reduction agent may be selected from the group consisting of a sacrificial electrode metal, a metal promoting a common ion effect with one of the electrode metals, seed metal particles serving as precipitation sites for the electrode metal, and combinations thereof. Improved reduction of electrode metal dissolution in the electrolyte is further achieved by operation of the cell under acid/base conditions of the electrolyte provided by a carbon dioxide partial pressure of about 0.5 to about 1.5 atmospheres. Further, reduction of electrode metal dissolution in molten alkali metal carbonates electrolyte fuel cell has been found to be obtained when the alkali metal carbonates electrolyte is lithium carbonate, potassium carbonate, and mixtures thereof. Our invention also includes the corresponding electrolytes for voltaic cells which serve to reduce the electrode metal dissolution.

While in the foregoing specification this invention has been described in relation to certain preferred embodiments thtereof, and many details have been set forth for purpose of illustration, it will be apparent to those skilled in the art that the invention is susceptible to additional embodiments and that certain of the details described herein may be varied considerably without departing from the basic principles of the invention.

We claim:

1. A method of reduction of electrode metal dissolution in electrolyte between two metal electrodes of a metalalkali metil carbonate electroltye fuel cell wherein oxidation Foccurs at one said electrode and reduction occurs at the second said electrode, said method comprising adding an electrode metal dissolution reduction agent to said electrolyte prior to operation of said cell, said electrode metal dissolution reduction agent selected from the group consisting of a sacrificial electrode metal, a metal promoting a common ion effect with one of said electrode metals, seed metal particles serving as precipitation sites for said electrode metal, and combinations thereof.

2. The method of claim 1 wherein said electrode metal dissolution reduction agent comprises a sacrificial metal the same as the metal of said electrodes.

3. The method of claim 1 wherein said electrode metal dissolution reduction agent comprises a metal promoting a common ion effect with one of said electrode metals.

4. The method of claim 1 wherein said sacrifical metal is provided in the oxidizing zone of said electrolyte toward a cathode from the oxidizing/reducing boundary.

5. The method of claim 1 wherein said cell has a cathode comprising principally nickel, said cathode nickel dissolution reduction agent comprises sacrificial nickel provided in the oxidizing zone of said electrolyte toward said cathode from the oxidizing/reducing boundary.

6. The method of claim 5 wherein said alkali metal carbonates electrolyte comprises lithium carbonate, sodium carbonate, and mixtures thereof.

7. The method of claim 5 wherein the acid/base conditions of said electrolyte during operation of said cell are maintained near neutral by a carbon dioxide partial pressure of about 0.5 to about 1.5 atmospheres.

8. The method of claim 5 wherein said nickel dissolution reduction agent comprises a porous structure having mean pore sizes of less than about 3 microns.

9. The method of claim 1 wherein said cell has a cathode comprising principally nickel.

10. The method of claim 1 wherein said electrode metal dissolution reduction agent comprises seed metal particles serving as precipitation sites for said electrode metal, said seed particles having mean diameters of about 0.1 to about 10 microns.

11. The method of claim 1 wherein seed metal particles are provided in said electrolyte in the region of the oxidizing/reducing boundary and to a depth of about 2 to about 20 mils from said boundary.

12. The method of claim 1 wherein said cell has a cathode comprising nickel, said cathode nickel dissolution reduction agent comprises seed metal particles serving as precipitation sites for said cathode nickel, said seed particles having mean diameters of about 0.1 to about 10 microns and located in the region of the oxidizing/reducing boundary and to a depth of about 2 to about 20 mils from said boundary.

13. The method of claim 12 wherein said alkali metal carbonates electrolyte comprises lithium carbonate, sodium carbonate, and mixtures thereof.

14. The method of claim 12 wherein the acid/base conditions of said electrolyte during operation of said cell are maintained near neutral by a carbon dioxide partial pressure of about 0.5 to about 1.5 atmospheres.

15. The method of claim 12 wherein said nickel dissolution reduction agent comprises a porous structure having mean pore sizes of less than about 3 microns.

16. The method of claim 1 wherein said electrode metal dissolution reduction agent comprises a porous structure having pore sizes less than the mean pore sizes of said electrodes.

17. The method of claim 16 wherein said electrode metal dissolution reduction agent porous structure has mean pore size of less than about 3 microns.

18. Method of reduction of electrode dissolution in electrolyte between two metal electrodes of a molten alkali metal carbonate electrolyte fuel cell wherein oxidation occurs at one said electrode and reduction occurs at the second said electrode, said method comprising: maintaining the acid/base conditions of said electrolyte during operation of said cell at near neutral by a carbon dioxide partial pressure of about 0.5 to about 1.5 atmospheres.

19. An electrolyte for a molten alkali metal carbonate electrolye fuel cell providing reduction of electrode metal dissolution, said electrolyte in addition to electrochemically active and support components comprising: an electrode metal dissolution reduction agent added to said electrolyte prior to operation of said cell, said electrode metal dissolution reduction agent selected from the group consisting of a sacrificial electrode metal, a metal promoting a common ion effect with one of said electrode metals, seed metal particles serving as precipitation sites for said electrode metal, and combinations thereof.

20. An electrolyte of claim 19 wherein said electrode metal dissolution reduction agent comprises a sacrificial metal the same as the metal of said electrodes.

21. An electrolyte of claim 19 wherein said electrode metal dissolution reduction agent comprises a metal promoting a common ion effect with one of said electrode metals.

22. An electrolyte of claim 19 wherein said sacrifical metal is provided in the oxidizing zone of said electrolyte toward a cathode from the oxidizing/reducing boundary.

23. An electrolyte of claim 19 wherein said cell has a cathode comprising principally nickel, said cathode nickel dissolution reduction agent comprises sacrificial nickel provided in the oxidizing zone of said electrolyte toward said cathode from the oxidizing/reducing boundary.

24. An electrolyte of claim 23 wherein said alkali metal carbonates electrolyte comprises lithium carbonate, sodium carbonate, and mixtures thereof.

25. An electrolyte of claim 19 wherein said nickel dissolution reduction agent comprises a porous structure having mean pore sizes of less than about 3 microns.

26. An electrolyte of claim 19 wherein said electrode metal dissolution reduction agent comprises seed metal particles serving as precipitation sites for said electrode metal, said seed particles having mean diameters of about 0.1 to about 10 microns.

27. An electrolyte of claim 26 wherein seed metal particles are provided in said electrolyte in the region of the oxidizing/reducing boundary and to a depth of about 2 to about 20 mils from said boundary.

28. An electrolyte of claim 19 wherein said cell has a cathode comprising nickel, said cathode nickel dissolution reduction agent comprises seed metal particles serving as precipitation sites for said cathode nickel, said seed particles having mean diameters of about 0.1 to about 10 microns and located in the region of the oxidizing/reducing boundary and to a depth of about 2 to about 20 mils from said boundary.

29. An electrolyte of claim 28 wherein said alkali metal carbonates electrolyte comprises lithium carbonate, sodium carbonate, and mixtures thereof.

30. An electrolyte of claim 28 wherein said nickel dissolution reduction agent comprises a porous structure having mean pore sizes of luss than about 3 microns.

31. An electrolyte of claim 19 wherein said electrode metal dissolution reduction agent comprises a porous structure having pore sizes less than the mean pore sizes of said electrodes.

32. An electrolyte of claim 19 wherein said electrode metal dissolution reduction agent porous structure has mean pore size of less than about 3 microns.

* * * * *